United States Patent [19]

Tamura

[11] Patent Number: 4,733,076
[45] Date of Patent: Mar. 22, 1988

[54] RADIATION IMAGE RECORDING AND READ-OUT APPARATUS

[75] Inventor: Kaoru Tamura, Kanagawa, Japan

[73] Assignee: Fuji Photo Film Co., Ltd., Kanagawa, Japan

[21] Appl. No.: 793,039

[22] Filed: Oct. 30, 1985

[30] Foreign Application Priority Data

Oct. 30, 1984 [JP] Japan ................................. 59-228757

[51] Int. Cl.$^4$ ............................................. G03C 5/16
[52] U.S. Cl. ................................. 250/327.2; 250/484.1
[58] Field of Search .............................. 378/172, 173; 250/327.2, 484.1

[56] References Cited

U.S. PATENT DOCUMENTS

| | | | |
|---|---|---|---|
| 4,507,797 | 3/1985 | Kato | 378/165 |
| 4,543,479 | 9/1985 | Kato | 250/327.2 |
| 4,578,582 | 3/1986 | Takano | 250/327.2 |

Primary Examiner—Carolyn E. Fields
Attorney, Agent, or Firm—Sughrue, Mion, Zinn, Macpeak & Seas

[57] ABSTRACT

A stimulable phosphor sheet recording and read-out apparatus comprises, as integrated in a single unit, an image recording section, an image read-out section, an erasing section and a circulation and conveyance system for conveying a plurality of different types of stimulable phosphor sheets along a circulation path passing through these sections. At least the part of the circulation path between the read-out section and the image recording section is provided with a set of parallel branch paths consisting of a number of paths equal to the number of types of stimulable phosphor sheets used, and with a sorting means for sorting the stimulable phosphor sheets into prescribed ones of the branch paths. When it is desired to use a particular type of stimulable phosphor sheet in an image recording and read-out operation, the desired type of sheet can be quickly and efficiently forwarded to the image recording section from the branch path prescribed for that type of sheet.

10 Claims, 1 Drawing Figure

U.S. Patent  Mar. 22, 1988  4,733,076
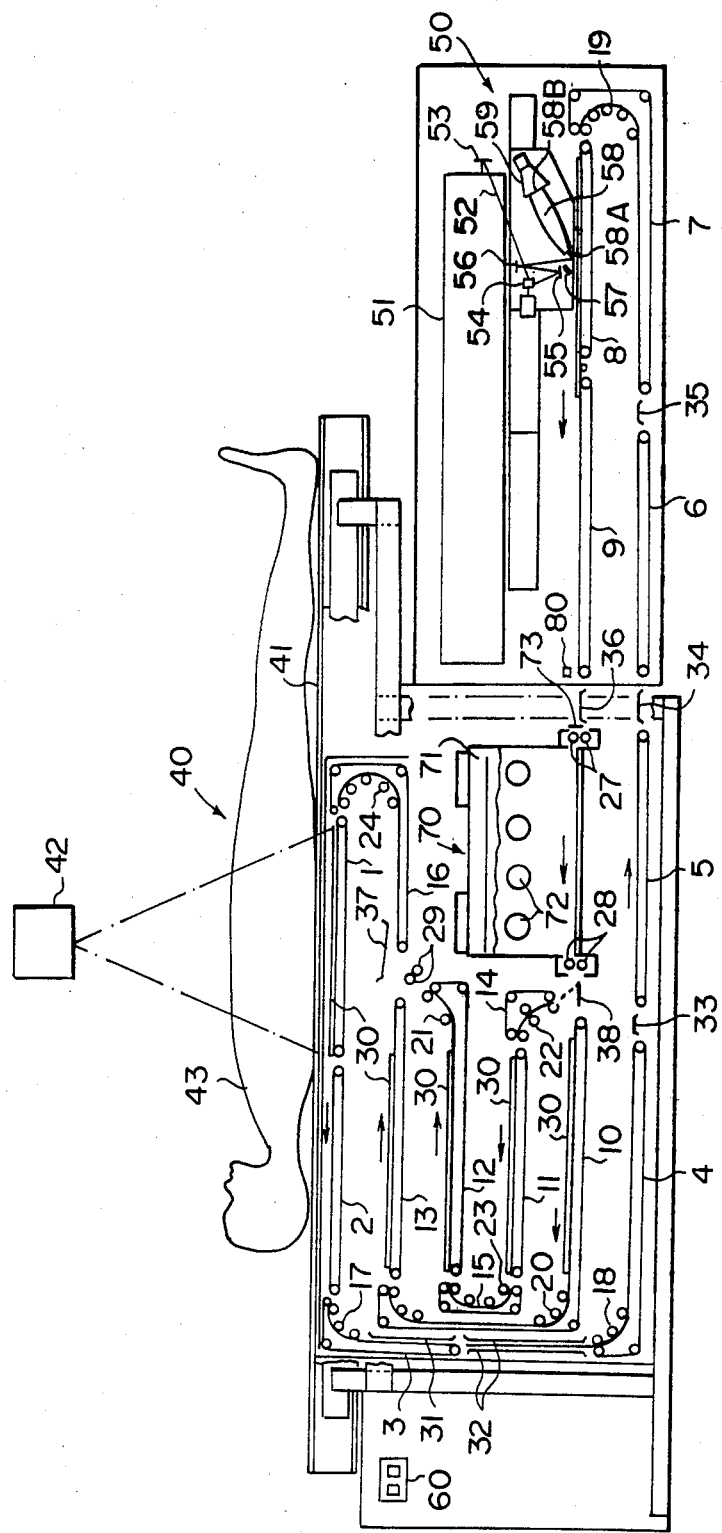

RADIATION IMAGE RECORDING AND READ-OUT APPARATUS

BACKGROUND OF THE INVENTION

1. Field of the Invention

This invention relates to an integrated radiation image recording and read-out apparatus comprising a image recording section for exposing a stimulable phosphor sheet to a radiation passing through an object to have a radiation image of the object stored thereon, an image read-out section for exposing the stimulable phosphor sheet to stimulating rays which cause them to emit light in proportion to the stored radiation energy, and detecting and converting the emitted light into electric signals which are used to reproduce a visible image from the read-out image information, and an erasing section for releasing the radiation energy remaining on said stimulable phosphor sheet after read-out. This invention particularly relates to such an apparatus in which stimulable phosphor sheets are circulated and reused for recording images and more particularly to such an apparatus in which a plurality of different types of stimulable phosphor sheets are circulated and reused for recording images.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed for example in Japanese Unexamined Patent Publication No. 56(1981)-11395 and U.S. Pat. Nos. 4,258,264, 4,315,318, 4,387,428 and 4,276,473, it has been proposed to use a stimulable phosphor in a radiation image recording and reproducing system. Specifically, a sheet comprising the stimulable phosphor (hereinafter referred to as a stimulable phosphor sheet) is first exposed to a radiation passing through an object such as a part of the human body to have a radiation image stored thereon, and then is scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed so as to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used only for temporarily storing the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image radiation recording and reproducing system and moves from place to place to record radiation images for mass medical examinations, it is disadvantageous to load the mobile X-ray diagnostic station with a large number of stimulable phosphor sheets, and the number of stimulable phosphor sheets loaded on the mobile X-ray diagnostic station should be minimized. Therefore, it is desirable to load the mobile X-ray diagnostic station with stimulable phosphor sheets which can be used repeatedly, once store the radiation images of the objects on the stimulable phosphor sheets, transfer the electric image signals read out from the stimulable phosphor sheets onto a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examinations. This is very advantageous in practical use.

In order to reuse stimulable phosphor sheets as described above, the radiation energy remaining on the stimulable phosphor sheet after it is scanned with stimulating rays to read out the radiation image stored thereon should be eliminated or erased as described, for example, in Japanese Unexamined Patent Publication No. 56(1981)-12599 and U.S. Pat. No. 4,470,619. The stimulable phosphor sheet can then be used again for radiation image recording.

From the practical point of view, therefore, it is very convenient to use an integrated apparatus in which at least one stimulable phosphor sheet is reused by repeatedly circulating it through an image recording section for recording a radiation transmission image of an object on the stimulable phosphor sheet by exposing it to a radiation passing through the object, an image read-out section for reading-out the radiation image stored on the stimulable phosphor sheet in the image recording section, and an erasing section for releasing the radiation energy remaining on the stimulable phosphor sheet after read-out so as to prepare it for recording of the next image thereon. This is because such an integrated apparatus can be easily installed in a mobile X-ray diagnostic station, thus making it easier to move from place to place for mass examinations, or in a hospital or the like.

The applicant therefore proposed in U.S. patent application No. 600,689 an integrated radiation image recording and read-out apparatus comprising an image recording section, an image read-out section and an erasing section built into a single unit further provided with a circulation and conveyance system for enabling circulation and reuse of the stimulable phosphor sheets.

Although this integrated apparatus is very convenient in actual practice since it makes it possible to continuously carry out the recording, read-out and erasure of radiation image information by repeatedly circulating one or more stimulable phosphor sheets, it has the shortcoming of being difficult to use with a plurality of different types of stimulable phosphor sheets. More specifically, when a plurality of different types of stimulable phosphor sheets are circulated through the appatatus, it is not easy to carry out recording and read-out of radiation image information using a selected one of the different types of sheets whenever the need arises.

This shortcoming of the apparatus becomes an especially serious problem when the apparatus is used for recording and read-out of radiation images of different types of objects such as the chest, head, bone and stomach of human beings, since in such cases it is general practice to select from among a plurality of different types of stimulable phosphor sheets the particular type that is best suited as regards sharpness, sensitivity etc. With the integrated apparatus, although it is possible to circulate a plurality of different types of stimulable phosphor sheets, after these sheets have been started circulating it is very difficult to change the order in which they circulate, so that in the image recording operation when the stimulable phosphor sheet that happens to be at the image recording section is of a different type from the desired one, the operator can only keep sending the stimulable phosphor sheets through the image recording section without recording images thereon until a stimulable phosphor sheet of the desired type arrives at the recording section. In the actual recording and read-out of radiation images this is inconvenient and also considerably impairs the efficiency of the recording and read-out operations.

SUMMARY OF THE INVENTION

The primary object of the present invention is to provide a radiation image recording and read-out apparatus which comprises, as integrated in a single unit, a radiation image recording section, a radiation image read-out section, an erasing section and a circulation and conveyance means for repeatedly circulating different types of stimulable phosphor sheets through said sections and which is capable of efficiently recording radiation image information on and reading out the recorded image information from a stimulable phosphor sheet of a selected type.

The present invention provides an integrated radiation image recording and read-out apparatus comprising:
(i) a circulation and conveyance system for conveying at least two types of stimulable phosphor sheets for recording radiation images thereon along a predetermined circulation path,
(ii) an image recording section positioned on said circulation path for recording a radiation image on each said stimulable phosphor sheet,
(iii) an image read-out section positioned on said circulation path for reading out the radiation images recorded on the stimulable phosphor sheets in the image recording section,
(iv) an erasing section positioned on said circulation path for releasing radiation energy remaining on the stimulable phosphor sheets after read-out in the image read-out section,
(v) at least one set of parallel branch paths consisting of a number of branch paths equal to the number of types of stimulable phosphor sheets provided at least in the part of the circulation path between the erasing section and the image recording section,
(vi) conveyance means provided one in each branch path,
(vii) sorting means for sorting the stimulating phosphor sheets conveyed along the circulation path by type and directing the stimulable phosphor sheets of each type into a prescribed one of the branch paths, and
(viii) stimulable phosphor sheet type designating means for use by an operator to send a sheet type designating signal to the conveyance means of a specific one of the branch paths, whereby a stimulable phosphor sheet of the designated type is selected from among the stimulable phosphor sheets directed into the branch paths by the sorting means and is sent to the recording section.

In the radiation image recording and read-out apparatus according to the present invention, since the image recording section, the image read-out section and the erasing section are integrated into a single unit and the sheet circulation and conveyance system for conveying stimulable phosphor sheets through these three sections is provided at least between the erasing section and the image recording section with a set of parallel branch paths consisting of a number of paths equal to the number of different types of stimulable phosphor sheets used, the sheets conveyed out of the erasing section can be sorted by type and directed into prescribed ones of the branch paths according to their type. Then when it is desired to carry out radiation image recording and read-out using a stimulable phosphor sheet of a particular type, a sheet of the desired type can be sent directly to the image recording section from the branch path prescribed for that type of sheet. Thus, when a plurality of different type of sheets are used, since the type of sheet required for a specific image recording and read-out operation can be immediately sent to the image recording section and used, it becomes possible to carry out the radiation image recording and read-out operation rapidly and with high efficiency.

BRIEF DESCRIPTION OF THE DRAWING

The single FIGURE is a schematic side sectional view of an embodiment of the radiation image recording and read-out apparatus in accordance with the present invention.

DESCRIPTION OF THE PREFERRED EMBODIMENT

The present invention will hereinbelow be described in further detail with reference to the accompanying drawing.

The FIGURE schematically shows an embodiment of the apparatus in accordance with the present invention, wherein a radiation image of the chest, abdomen or the like of a lying object is recorded. The apparatus is provided with a circulation and conveyance system used for circulating stimulable phosphor sheets 30 along a circulation path and comprising endless belts 1–16, guide rollers 17–24 rotated respectively by the endless belts 3, 4, 7, 10, 12, 14, 15 and 16, guide plates 31–37, nip rollers 27–29 and a sorter plate 38. The part of the circulation path between an erasing section 70, which will be described in detail later, and the endless belt 1 is divided into a first branch path formed by the endless belts 10 and 13 and a second branch path lying parallel to the first branch path and formed by the endless belts 11 and 12, and the stimulable phosphor sheets 30 sent from the erasing section 70 are directed into one or the other of the first and second branch paths by the sorter plate 38. The sorter plate 38 directs the stimulable phosphor sheets 30 to the appropriate branch path according to the type thereof on the basis of, for example, sheet type information received from a sensor 80 positioned at the entrance to the erasing section 70 for reading identification marks affixed on the stimulable phosphor sheets 30 at a position outside of the radiation image recording region therof.

The endless belts 1 and 2 uppermost in the sheet conveyance and circulation system are positioned end to end to lie horizontally and a recording table 41 is positioned thereabove. A radiation source 42, for example an X-ray source, is spaced above the image recording table 42 to stand face to face with the endless belt 1. An image recording section 40 is constituted by the image recording table 41 and the radiation source 42. When a radiation image of an object 43 is recorded on the sheet 30, the sheet 30 is positioned on the endless belt 1, and the radiation source 42 is activated with the object 43 lying on the image recording table 41. In this manner, the sheet 30 is exposed to a radiation passing through the object 43 to have a radiation image of the object 43 stored on the sheet 30.

An image read-out section 50 is positioned at the right end of the sheet circulation and conveyance system. At the image read-out section 50, a laser beam source 51 is positioned above the endless belt 8 constituting a part of the image read-out section 50, and a mirror 53, a galvanometer mirror 54, and mirrors 55 and 56 are positioned for scanning a laser beam 52 in the main scanning direction on the sheet 30 carrying the radiation image stored thereon. The sheet 30 has been subjected to image recording at the image recording section 40 and then conveyed to the image read-out section 50 by operating the endless belts 1-8 of the sheet conveyance and circulation system. A light guiding reflection mirror 57 is positioned along the main scanning direction at the scanning portion of the laser beam 52 on the sheet 30. When the sheet 30 is exposed to the laser beam 52, the sheet 30 emits light in proportion to the stored radiation energy. The light emitted by the sheet 30 directly toward a light guide member 58 and the light emitted thereby and reflected by the light guiding reflection mirror 57 both enter the light guide member 58 from a light input face 58A thereof, and is guided inside of the light guide member 58 through total reflection to a light output face 58B thereof. The light is thus detected by a photomultiplier 59 connected to the light output face 58B of the light guide membert 58. Simultaneously with the scanning of the sheet 30 by the laser beam 52 in the main scanning direction, the sheet 30 is moved by the endless belt 8 in the sub-scanning direction as indicated by the arrow approximately normal to the main scanning direction, so that the whole surface of the sheet 30 is scanned by the laser beam 52. An electric image signal obtained by the photomultiplier 59 is sent to an image processing circuit (not shown) for processing the electric image signal. The image signal thus processed is then sent to an image reproducing apparatus (not shown). The image reproducing apparatus may be a display device such as a CRT, or a device for recording a visible image by point-by-point scanning on a photographic film. Or, the processed image signal may be stored in a storage means such as a magnetic tape for reproduction as a visible image at a later time.

In general, the time taken for reading out a radiation image from one sheet 30 is longer than the time taken for recording the radiation image on the sheet 30. However, it is possible to quickly finish image recording on a plurality of the sheets 30 and maintain the exposed sheets 30 one by one, for example, on the endless belts 7, 6, 5, 4 and 2 prior to read-out. Also, for example, Japanese Unexamined Patent Publication No. 58(1983)-89245 discloses a method wherein a read-out operation for detecting the image input information of a radiation image stored on a stimulable phosphor sheet (hereinafter referred to as preliminary read-out) is conducted in advance by use of stimulating rays having a stimulation energy of a level lower than than that of the stimulation energy of stimulating rays used in a read-out operation for obtaining a visible image for viewing, particularly for diagnostic purposes (hereinafter referred to as the final read-out), and thereafter the final read-out is adjusted and/or appropriate signal processing is conducted to obtain a visible image having an improved image quality, particularly a high diagnostic efficiency and accuracy regardless of radiation exposure conditions. In the apparatus of the present invention, too, it is possible to conduct the preliminary read-out and the final read-out by returning the sheet 30, which has been sent onto the endless belt 9 after image read-out, back to the image read-out position by reversely rotating the endless belts 7, 8 and 9.

After image read-out is finished, the sheet 30 is conveyed by the endless belt 9 to the erasing section 30 comprising a case 71 and many erasing light sources 72, e.g. fluorescent, tungsten, sodium, xenon or iodine lamps, arranged within the case 71. After a shutter 73 is opened, the sheet 30 is conveyed by the endless belt 9 until the forward end of the sheet 30 contacts the nip rollers 27. The sheet 30 is thus sent into the case 71 by the rotating nip rollers 27. Then, the shutter 73 is closed and the erasing light sources 72 are turned on. The erasing light sources 72 arranged within the case 71 mainly emit light having a wavelength within the stimulation wavelength range for the stimulable phosphor of the stimulable phosphor sheet 30. When the sheet 30 is exposed to the erasing light, the radiation energy remaining in the sheet 30 after image read-out is released.

After the radiation energy remaining on the sheet 30 is erased to such an extent that the next image recording on the sheet 30 is possible, the nip rollers 28 are rotated and the sheet 30 is conveyed out of the erasing section 70. Simultaneously with the exit of the stimulable phosphor sheet 30 from the erasing section 70, the sorter plate 38, which is positioned near the outlet of the erasing section 70, is operated on the basis of a sheet type identification signal received from the sensor 80 positioned near the inlet to the erasing section 70 for reading sheet type identification marks provided on the respective stimulable phosphor sheets 30. As a result of the operation of the sorter plate 38, the stimulable phosphor sheet 30 conveyed out of the erasing section 70 is directed into one or the other of the first and second branch paths. It is thus possible, for example, to sort high sharpness sheets into the first branch path and low sharpness sheets into the second branch path. The sheets 30 sorted into the first branch path thereafter wait on the endless belts 10 and 13, while those sorted into the second branch path wait on the endless belts 11 and 12. Then when a radiation image is to be recorded in the image recording section 40, a sheet 30 of the required type is conveyed out of the appropriate one of the two branch paths onto the endless belt 16, and then from the endless belt 16 to the endless belt 1 at the image recording section 40.

In this case, when a sheet 30 waiting on the endless belt 12 is conveyed onto the endless belt 16, the nip rollers 29 are rotated to assist the transfer of the sheet 30 between the two endless belts. On the other hand, when a sheet 30 waiting on the endless belt 13 is conveyed onto the endless belt 16, the rotation of the nip rollers 29 is stopped and the sheet 30 is transferred directly from one belt to the next.

The selection of the type of stimulable phosphor sheet 30 required for radiation image recording in the image recording section 40 is made by operating a switch 60 provided on the exterior of the apparatus. One possible arrangement is to position a total of four stimulable phosphor sheets of a first type one each on the endless belts 1, 8, 10 and 13, and a total of two stimulable phosphor sheets of a second type one each on the endless belts 11 and 12, normally carry out radiation image recording using only the four stimulable phosphor sheets of the first type, and carry out radiation image recording using the two stimulable phosphor sheets of the second type as a special mode of radiation image recording and read-out operation when required. In this case the switch 60 is arranged to actuate the operation of the endless belts 11 and 12 and need be operated only when designating the special mode of operation using the stimulable phosphor sheets of the second type.

Alternatively, the arrangement may be such that the switch 60 has to be operated to designate the sheet type for every image recording operation.

In the aforesaid embodiment, two sheets of the second type are positioned one each on the endless belts 11 and 12, whereby it becomes possible to use these two sheets whenever the need arises. However, once these two sheets have been used, it is not possible to use a sheet of the same type again until one or two sheets of the other type have passed through the image recording section 40. If this is inconvenient and it is desired to be able to use the sheets of the second type without any restriction on time of use whatsoever, it suffices to use only two of each type of sheet (a total of four sheets rather than six) in the aforesaid embodiment.

In the aforesaid embodiment the sensor 80 for identifying the type of each of the stimulable phosphor sheets 30 is positioned near the inlet to the erasing section 70. However, the sensor 80 need not necessarily be located at this position and can instead be positioned anywhere convenient within the circulation path. Alternatively, instead of providing the sensor 80, it is possible to track the positions of the individual sheets 30 of both types from a knowledge of their positions at the start of operation and the operations of the endless belts, whereby it can always be known which type of sheet will be next to arrive at the sorter plate 38.

Also, while in the aforesaid embodiment the stimulable phosphor sheets 30 from the first and second branch paths are conveyed onto the endless belt 1 at the image recording section 40 via the endless belt 16, it is possible to position the upstream ends of the first and second branch paths immediately adjacent to the downstream end of the endless belt 1, thereby eliminating the need for the endless belt 16. When this arrangement is employed, the sheets 30 are conveyed directly from the first and second branch paths to the endless belt 1, making it possible to carry out radiation image recording even more rapidly.

Moreover, differently from the aforesaid embodiment which is provided with parallel branch paths only in the part of the circulation path between the erasing section and the image recording section, it is alternatively possible to also provide sets of branch paths in the parts of the circulation path between the image recording section and the image read-out section, and between the image read-out section and the erasing section. When these additional branch paths are provided, it becomes possible to maintain a large number of currently unrequired stimulable phosphor sheets in standby condition in the branch paths and to use these sheets whenever the need arises.

I claim:

1. An integrated radiation image recording and read-out apparatus comprising:
   (i) a circulation and conveyance system for conveying at least two types of stimulable phosphor sheets for recording radiation images thereon along a predetermined circulation path,
   (ii) an image recording section positioned on said circulation path for recording a radiation image on each stimulable phosphor sheet by exposing said stimulable phosphor sheet to a radiation having image information,
   (iii) an image read-out section positioned on said circulation path and provided with a stimulating ray source for emitting stimulating rays for scanning said stimulable phosphor sheet carrying said radiation image stored thereon at said image recording section, and a photoelectric read-out means for detecting light emitted by said stimulable phosphor sheet scanned by said stimulating rays to obtain an electric image signal,
   (iv) an erasing section positioned on said circulation path for, prior to next recording on said stimulable phosphor sheet for which the image read-out has been conducted at said read-out section, releasing radiation energy remaining on the stimulable phosphor sheets after read-out in the image read-out section,
   (v) at least one set of parallel branch paths consisting of a number of branch paths equal to the number of types of stimulable phosphor sheets provided at least in the part of the circulation path between the erasing section and the image recording section,
   (vi) conveyance means provided one in each branch path for conveying stimulable phosphor sheets of a prescribed type therethrough,
   (vii) sorting means positioned at the inlet side of the branch paths near the erasing section for sorting the stimulable phosphor sheets conveyed along the circulation path by type and directing the stimulable phosphor sheets of each type into a prescribed one of the branch paths, and
   (viii) designating means for use by an operator to send a sheet type designating signal to the conveyance means of a specific one of the branch paths, wherein a stimulable phosphor sheet of the designated type is selected from among the stimulable phosphor sheets directed into the branch paths by the sorting means and is sent to the recording section.

2. An apparatus as defined in claim 1 wherein said sorting means is a sorter plate.

3. An apparatus as defined in claim 2 wherein said sorter plate is operated on the basis of a sheet type identification signal produced by a sensor means positioned on the circulation path.

4. An apparatus as defined in claim 3, wherein said sensor means interprets sheet type identification marks on said stimulable phosphor sheets to provide said sheet type identification signal.

5. An apparatus as defined in claim 3 wherein said sorter plate is operated on the basis of a sheet type identification signal produced on the basis of a knowledge of the position of said stimulable phosphor sheets at the start of operation of the image recording and readout apparatus and the operation of endless belts during said operation of the image recording and read-out apparatus.

6. An apparatus as defined in claim 1 comprising means for transferring said stimulable phosphor sheets directly from said branch paths to said image recording section.

7. An apparatus as defined in claim 1 further comprising an intermediate endless belt positioned to transfer said stimulable phosphor sheets from said branch paths to said image recording section.

8. An apparatus as defined in claim 1 wherein said designating means is a switch.

9. An apparatus as defined in claim 1 wherein the image recording and read-out operation is normally carried out using a specified type of stimulable phosphor sheets and said designating means is operated only when the image recording and read-out operation is to be carried out using a type of stimulable phosphor sheets other than the specified type.

10. An integrated radiation image recording and read-out apparatus comprising:
   (i) a circulation and conveying system for conveying at least two types of stimulable phosphor sheets for recording radiation images thereon along a predetermined circulation path,
   (ii) an image recording section positioned on said circulation path for recording a radiation image on each stimulable phosphor sheet by exposing said stimulable phosphor sheet to a radiation having image information,
   (iii) an image read-out section positioned on said circulation path and providing with a stimulating ray source for emitting stimulating rays for scanning said stimulable phosphor sheet carrying said radiation image stored thereon at said image recording section, and a photoelectric read-out means for detecting light emitted by said stimulable phosphor sheet scanned by said stimulating rays to obtain an electric image signal,
   (iv) an erasing section positioned on said circulation path for, prior to a next recording on said stimulable phosphor sheet for which the image read-out has been conducted at said read-out section, releasing radiation energy remaining on the stimulable phorphor sheets after read-out in the image read-out section,
   (v) at least one set of parallel branch paths consisting of a number of branch paths equal to the number of types of stimulable phosphor sheets provided, at least in the part of the circulation paths between the erasing section and the image recording section,
   (vi) conveyance means provided one in each branch path for conveying stimulable phosphor sheets of a prescribed type there through,
   (vii) sorting means positioned at the inlet side of the branch paths near the erasing section for sorting the stimulable phosphor sheets conveyed along the circulation path by type and directing the stimulable phosphor sheets of each type into a prescribed one of the branch paths, and
   (viii) designating means for use by an operator to send a sheet type designating signal to the conveyance means of a specific one of the branch paths, wherein a stimulable phosphor sheet of the designated type is selected from the stimulable phosphor sheets directed into the branch paths by the sorting means, and is sent to the recording section,
   said sorting means being operated on the basis of a sheet type identification signal produced by a sensor means positioned on the circulation path, and
   wherein said sensor means interprets sheet type identification marks on said stimulable phosphor sheets to provide said sheet type identification signals.

* * * * *